United States Patent
Schoen et al.

(10) Patent No.: US 8,084,900 B2
(45) Date of Patent: Dec. 27, 2011

(54) ASYMMETRICAL STATOR OF AN ELECTRICAL MACHINE

(75) Inventors: Ludwig Schoen, Ludwigsburg (DE); Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 12/194,583

(22) Filed: Aug. 20, 2008

(65) Prior Publication Data

US 2010/0045122 A1 Feb. 25, 2010

(51) Int. Cl.
*H02K 1/14* (2006.01)
*H02K 7/14* (2006.01)
*H02K 3/52* (2006.01)
*H02K 1/06* (2006.01)

(52) U.S. Cl. ..... 310/50; 310/254.1; 310/47; 310/156.33

(58) Field of Classification Search .......... 310/47, 310/50, 40, 179, 258, 42, 46, 172, 173, 174, 310/187, 67, 254, 156.33, 186; 318/138, 318/439, 254; H02K 1/14, 3/52, 1/06, 23/42, H02K 23/16, 15/06, 7/14
See application file for complete search history.

(56) References Cited

U.S. PATENT DOCUMENTS

| 3,643,118 | A | * | 2/1972 | Ichiki et al. ............... 310/40 R |
| 3,749,956 | A | | 7/1973 | Reiss |
| 4,071,793 | A | * | 1/1978 | Cox ........................... 310/71 |
| 4,943,747 | A | * | 7/1990 | Lee ............................ 310/67 R |
| 5,182,848 | A | * | 2/1993 | Wheeler ..................... 310/90 |
| 5,955,814 | A | | 9/1999 | Fujiwara |
| 6,713,929 | B2 | * | 3/2004 | Meyer et al. ................ 310/216 |
| 6,952,065 | B2 | | 10/2005 | Park et al. |
| 7,081,698 | B1 | * | 7/2006 | Burkholder et al. ......... 310/261 |
| 2003/0190877 | A1 | * | 10/2003 | Gallagher et al. ........... 451/344 |
| 2004/0169432 | A1 | | 9/2004 | Park et al. |

FOREIGN PATENT DOCUMENTS

| DE | 2 021 357 | 11/1970 |
| DE | 38 42 807 | 9/1989 |
| DE | 295 21 313 | 12/1996 |
| DE | 197 00 074 | 9/1997 |
| DE | 298 00 928 | 4/1998 |
| DE | 696 05 595 | 6/2000 |
| DE | 603 12 471 | 6/2007 |
| EP | 0 730 334 | 9/1996 |
| EP | 1 499 000 | 1/2005 |
| GB | 2 163 607 | 2/1986 |
| GB | 2 222 729 | 3/1990 |
| JP | 10-23690 | 1/1998 |

* cited by examiner

*Primary Examiner* — Quyen Leung
*Assistant Examiner* — Michael Andrews
(74) *Attorney, Agent, or Firm* — Michael J. Striker

(57) ABSTRACT

A stater of an electrical machine has a cross section, a longitudinal extension, a jacket surface, a plurality of winding holders configured so that at least one of the winding holders for receiving a field winding has a larger winding width than another of the winding holders.

15 Claims, 2 Drawing Sheets

ASYMMETRICAL STATOR OF AN ELECTRICAL MACHINE

BACKGROUND OF THE INVENTION

The present invention is directed to a stator of an electrical machine, an electrical machine, and a power tool.

Electrical machines that are composed of a stator and a rotor, and that may be operated using alternating current or direct current, are also referred to as universal motors. Electric motors of this type are often used in household appliances and power tools, they may be powered by an alternating-current system, and a rectifier may also be used.

Increasingly greater energy densities are being required specifically of power tools, e.g., of angle grinders, since customers continually demand ever-smaller tools. The reduction in tool size should not necessarily require that the power also be reduced. Instead, reduced tool size should make it possible to increase the power. Basic limiting geometric conditions often makes this impossible, however.

With small angle grinders, for example, the electric motor is located directly in the user's grip region. The diameter of the electric motor is therefore particularly significant in this region, since it directly affects the diameter of the grip. Angle grinders typically have a further property that influences the grip shape and diameter, however. The tool is set into operation by actuating a pushbutton, and the switch-on motion takes place via a sliding switch that passes by the electric motor, in the rear region of the tool, in order to actuate an electrical switch that is located there inside the tool housing. To this end, the field core of the electric motor has a flat region in the axial direction on both sides of the field core. The housing in the grip region therefore encloses the electric motor, a sliding switch, and possibly an air gap between the electric motor and the housing, to ensure adequate cooling.

If the sliding switch is moved too closely to the field core, i.e., the laminated iron core, there is a risk that the field windings of the sliding switch could become jammed due to accumulation of dirt or deformation due to high temperature, thereby impairing or blocking the switch-on function—and, primarily, the switch-off function—of the device.

For this reason, two-pieced fields, i.e., a longitudinally divided field core with two core halves, have been provided, in the case of which the field core is separated in the pole separation. The field winding may be inserted in the core halves very easily and accurately, as a premanufactured coil or by winding the coil directly in place. The core halves are placed on top of each other before installation, and they are installed together with the motor housing. The two-pieced core is typically flat on the sides and makes it possible to obtain a much greater distance between the sliding switch and the field core than is possible with a one-pieced design. In the one-pieced design, the field core is composed of only one laminated core. The width of the field winding is greater than it is with a one-pieced field, however, with the disadvantage of higher losses in the field winding as compared with the one-pieced design.

SUMMARY OF THE INVENTION

The present invention is directed to a stator of an electrical machine, in particular of a universal motor, with a cross section, a longitudinal extension, and a jacket surface.

It is provided that at least one winding holder for receiving a field winding has a larger winding width than does another winding holder.

Basically, the stator may be used in electric motors or in generators. They are used particularly advantageously in universal motors for household devices and power tools. The stator may be designed with a one-pieced configuration with a field core, that is composed of a single laminated core, or it may have a two-pieced or multiple-pieced design, with which the field core is therefore composed of two or more laminated cores. The field core may even be composed of solid material or sintered material instead of laminated iron.

Advantageously, the winding holder with the larger winding width may be provided on one side of the cross section, and a winding holder with a smaller winding width may be provided on the opposite side of the cross section.

Advantageously, due to the asymmetrical location of the winding widths of the field windings in one of the halves of the stator, a favorable geometry results for a one-pieced design of a field core, which results in a relative short winding length due to a relatively small winding width of the field winding, which, in turn, results in low ohmic resistance and, therefore, low electrical losses in the field winding, which is usually made of copper. This results in favorable efficiency with a correspondingly favorable, high energy density for an electrical machine, especially since it is not necessary to provide open space for installation in a motor housing. Instead, the stator may optimally fill a motor housing on this side and make optimal use of its installation space. As such, a relatively great deal of iron is available on this side for the electromagnetic effects of the electrical machine and/or the electric motor.

The asymmetrical placement of the winding widths on the opposite side of the stator cross section with the larger winding width also results in a desired open space when installed in a housing, which open space may be used for any type of component, e.g., for accommodating a sliding switch, for guiding lines, etc. The inner diameter of the stator in which a rotor may be accommodated remains unchanged. The large, flat region of the jacket surface of the field core on this side of the stator results in an advantageous synergy based on the installation space in a housing. Despite the increased winding width on this side of the stator, a favorable energy overall results for the electrical machine in which the inventive stator is inserted.

A flat section may be formed in the jacket surface, in parallel with the longitudinal extension, and at that point of the cross section on which the winding holder with the larger winding width is located. The flat section makes it possible to create a large open space when the stator is accommodated in a housing, in particular a cylindrical or at least partially cylindrical housing, e.g., in a grip part of an angle grinder.

Advantageously, the wall of the stator may be designed thinner in the region of the larger winding width than it is in the region of the smaller winding width. As a result, free space outside of the stator may be attained on this side of the stator when the stator is inserted in a housing.

A favorable installation of field windings is possible when an axial division of the stator into two halves may be provided, in which case the at least one flat section is located entirely in one half. The windings may be prefabricated and inserted in the freely accessible interior of the stator halves, or they may be wound directly in the winding holders.

According to a further aspect of the present invention, an electrical machine, in particular a universal motor, with a stator that has a cross section, a longitudinal extension, and a jacket surface, and a rotor, which interacts with the stator are provided, with which at least one winding holder—that is provided for receiving a field winding—has a larger winding width than does another winding holder. The electrical machine offers a high energy density while providing a relatively great deal of installation space between the stator and the housing. Large winding widths and large winding heads with a correspondingly greater winding length are necessary in only one part of the stator, while, in another part of the stator, a smaller winding length results in lower ohmic losses.

A flat section may be formed in the jacket surface, in parallel with the longitudinal extension, and at that point of the cross section on which the winding holder with the larger winding width is located. A large open space is provided between the flat section and a housing that encloses the stator, which may accommodate components such as a sliding switch, electrical lines, capacitors, coils, electronics printed circuit boards, resistors, signal lines, optical waveguides, coolant lines, and the like.

Advantageously, the jacket surface may be designed to fit inside a cylindrical motor housing for this purpose.

According to a further aspect of the present invention, a power tool, in particular an angle grinder, with an electric motor located inside a housing, with a stator that has a cross section, a longitudinal extension and a jacket surface, and a rotor are provided, with which at least one winding holder—that is provided for receiving a field winding—has a larger winding width than does another winding holder.

Advantageously, a flat section may be formed in the jacket surface, in parallel with the longitudinal extension, and at that point of the cross section on which the winding holder with the larger winding width is located. There is a great deal of open space available in the region of the flat section.

A recess for guiding a sliding element and/or an electrical supply line and/or a signal line and/or a fluid line may be formed in the flat section.

Further advantages result from the description of the drawing, below. Exemplary embodiments of the present invention are shown in the drawing. One skilled in the art will also advantageously consider the features disclosed in the drawing, the description and the claims individually and combine them to form further reasonable combinations.

DESCRIPTION OF THE PREFERRED EMBODIMENTS

Figure 1:
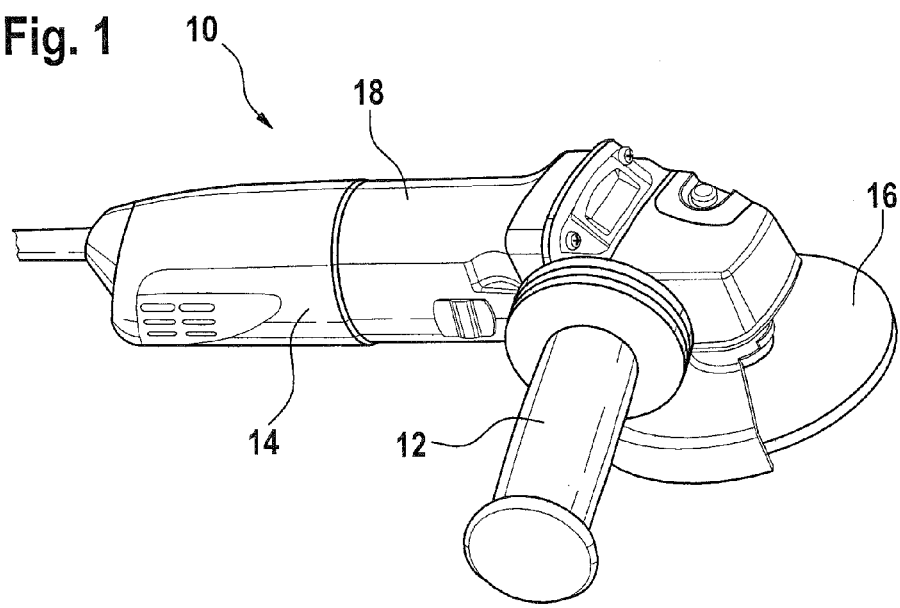
FIG. 1 shows a preferred power tool in the form of an angle grinder.

Elements that are the same or similar are labelled with the same reference numerals in the figures.

To explain the present invention, FIG. 1 shows a preferred power tool 10 designed as an angle grinder. Power tool 10, which is designed as an angle grinder, includes a grip part 14, in the front section of which—that points toward an insertion tool 16—a motor housing 18 is located. A handle 12 extends outwardly, transversely to grip part 14. During handling, a user holds handle 12 with one hand, holds grip part 14 with the other hand, and guides power tool 10—which is designed as an angle grinder—with insertion tool 16 over a work piece to be machined. The diameter of grip part 14 is therefore advantageously limited to a magnitude such that the user may hold grip part 14 with one hand and securely guide it.

Figure 2:
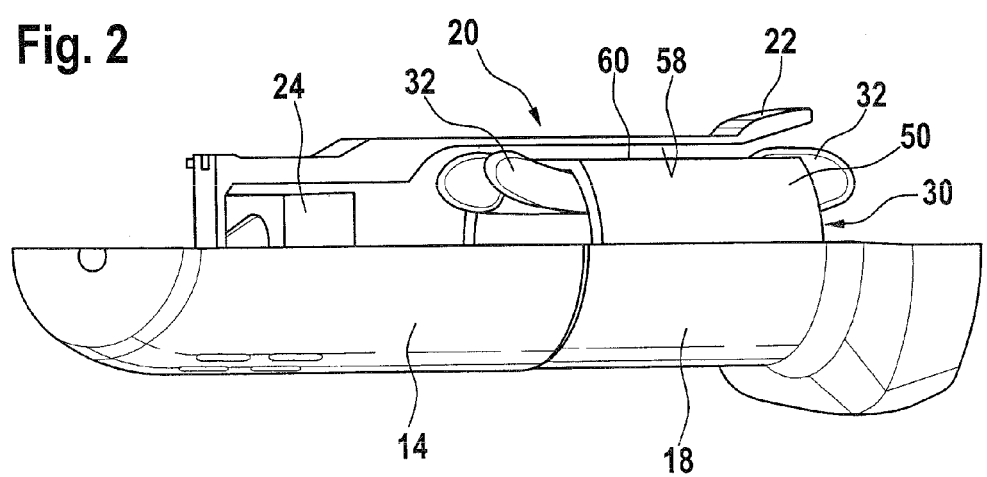
FIG. 2 shows a cross section of the grip part of the angle grinder in FIG. 1.

FIG. 2 shows a cross section of grip part 14 of the angle grinder in FIG. 1. An electric motor 30 designed as a universal motor is inserted in motor housing 18, the longitudinal axis of which lies in the longitudinal direction of grip part 14. An upper and a lower winding head of a field coil 32 are shown, which extend axially out of a stator 50 of electric motor 30. A flat section 60 on a jacket surface 58 of stator 50 is shown.

A sliding switch 20 is located above flat section 60, which is actuated via a pushbutton 22 that is accessible to the user from the outside, and which is slid backward toward a switch 24 located inside grip part 14.

The diameter of stator 50 and the distance between sliding switch 20 and stator 50 essentially determine the diameter of grip part 14.

Figure 3:
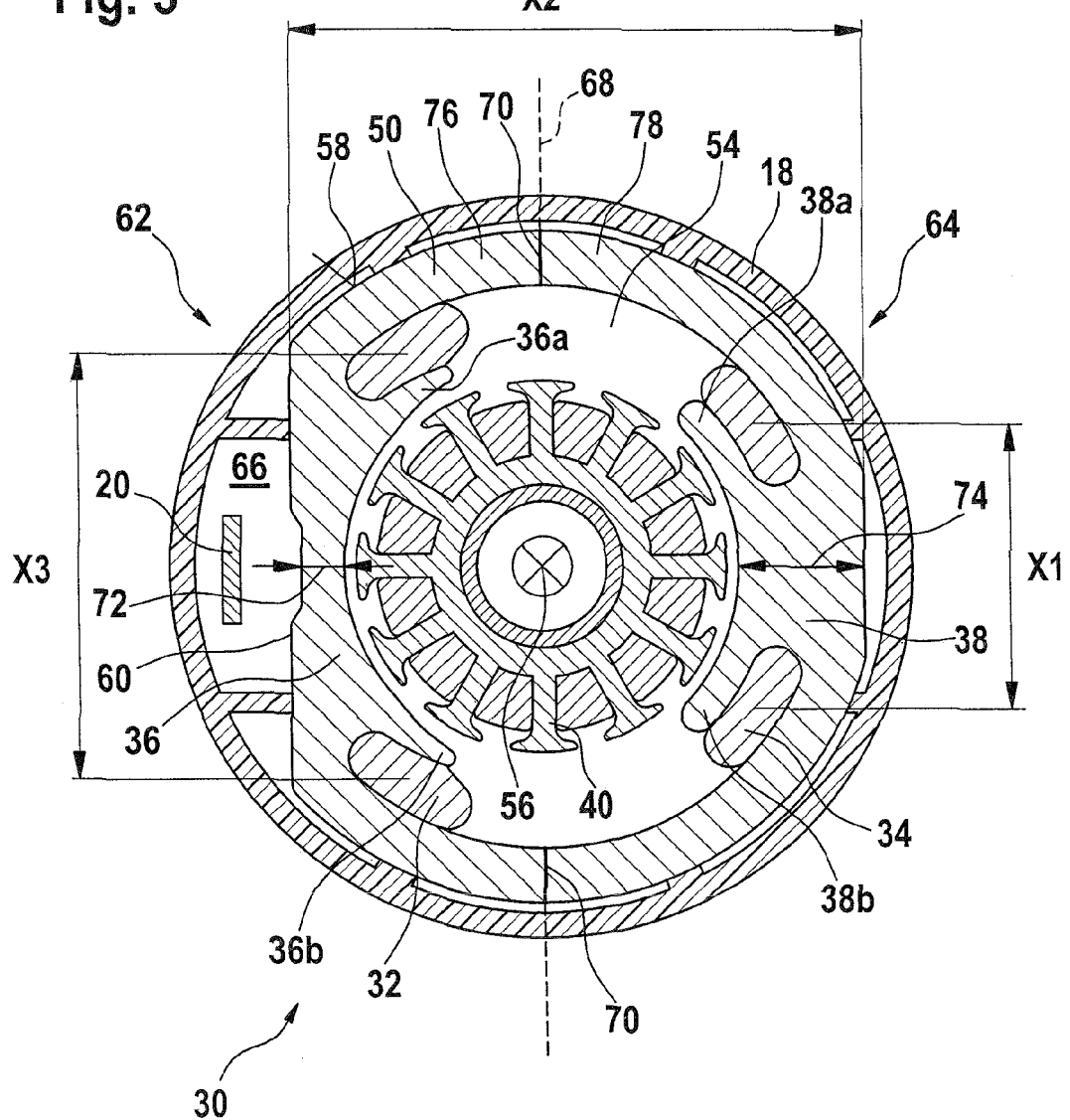
FIG. 3 shows a top view of a cross section of the grip part in FIGS. 1 and 2.

The details of preferred stator 50 and preferred electric motor 30, which is designed as a universal motor, are shown in a top view in FIG. 3, and in a cross section 54 of grip part 14 in FIGS. 1 and 2. Stator 50 includes, e.g., two pole shoes, which serve as winding holders 36, 38.

A rotor 40, which is designed as an internal rotor, is located inside stator 50. Stator 50 and rotor 40 are located inside a preferably cylindrical or nearly cylindrical motor housing 18, which encloses a jacket surface 58 of stator 50 as closely as possible. The air gap between motor housing 18 and jacket surface 58 serves to air-cool electric motor 30. The axial extension of rotor 40, stator 50, and motor housing 16 is indicated by longitudinal extension 56, which is drawn as an axis in the top view.

Stator 50 has an asymmetrical cross section. Cross section of stator 50 is divided into two sides 62 and 64, based on a separating line 68, which is shown as a dashed line. Side 64 shown on the right in the figure includes a winding holder 38 with pole horns 38a, 38b, around which a field winding 34 is located, and which has a relatively small winding width X1. Field winding 34 is located, as is typical, in a slot between pole horn 38a and 38b and inside of stator 50. Jacket surface 58 of stator 50 is flattened slightly symmetrically to winding holder 38.

If stator 50—in the embodiment shown, with pole horns 38a, 38b on side 64—were designed with mirror symmetry around separating line 68, this would correspond to a typical one-pieced design of a stator with a single laminated core as the field core.

The asymmetrical design of stator 50 is shown clearly via a winding holder 36 with pole horns 36a, 36b on opposite side 62 of cross section 54, which requires a much greater winding width X3 than on opposite side 64. Pole horns 36a, 36b extend more closely to separating line 68 than do pole horns 38a, 38b, so that field winding 32 also extends more closely to separating line 68 than do pole horns 38a, 38b of field winding 34. Windings 32, 34 are electrically connected with each other in the typical manner, so that rotor 40 will rotate when current is applied to windings 32, 34. Despite the asymmetrical design of stator 50, the pole axes, which form the center of winding holders 36, 38, are symmetrical to each other, and the interconnection angle on the other side is 180°, as measured between the pole axes in the center of winding holders 36, 38.

Jacket surface 58 of stator 50 has a flat section 60 on side 62, which creates an open space 66 between jacket surface 58 and motor housing 18, in which sliding switch 20 may be moved at a sufficient distance away from stator 50. A dimension X2, which represents the distance between flat section 60 and the small gap on side 64, is designed to be asymmetrical around separating line 68. Pole horns 36a, 36b of pole halves (winding holder 36) with the larger winding width X3 are designed to be shorter in length than pole homes 38a, 38b of the pole halves (winding holder 38) with the smaller winding width X1.

If stator 50 in this embodiment would be symmetrical around separating line 68 on side 62, the embodiment would correspond to that of a two-pieced field core with pronounced flat sections on the side and a large winding width.

Stator 50 has—in the region of flat section 60 and, therefore, in the region of the larger winding width X3 on the pole axis in the center of winding holder 36—a thinner wall thickness 72, while wall thickness 74 on the pole axis of winding holder 38 is greater in the region of smaller winding width X1.

As an option, stator 50 may be divided axially into two halves 76, 78, as indicated using dashed lines on diametrically opposed separating points 70. Flat section 60 is located entirely in one half 76. In this case, field windings 32, 34 may be placed in each half 76, 78, and halves 76, 78 may be joined together. Halves 76, 78—with field windings 32, 34 installed—are then inserted in motor housing 18. Windings 32, 34 may be electrically connected with each other before or after they are inserted in motor housing 18.

The preferred embodiment of stator 50, in combination with a cylindrical or nearly cylindrical housing 18, and in combination with a sliding switch 20, results in optimal use of the installation space in housing 18 and an advantageously small diameter of grip part 14 with a high power output, in particular with a universal motor that is installed in a hand-held power tool 10.

It will be understood that each of the elements described above, or two or more together, may also find a useful application in other types of constructions differing from the types described above.

While the invention has been illustrated and described as embodied in a stator of an electrical machine, electrical machine, and power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A stator of an electrical machine, comprising:
a cross section having a separating line dividing the cross section into a first side and a second side which are diametrically opposite to one another;
a housing accommodating the stator and a rotor located inside the stator;
a plurality of winding holders including at least a first winding holder located in the first side and having a first winding width, and a second winding holder located in the second side and having a second winding width being less than the first winding width, the first and second winding holders being provided diametrically opposite to one another and asymmetrically around the separating line on the cross section;
wherein the first winding holder defines an open space in the first side between the housing and the stator, which open space is greater than a space defined by the second winding holder in the second shape.

2. A stator of an electrical machine as defined in claim 1, further comprising a jacket surface having a flat section whereat the first winding holder is located.

3. A stator of an electrical machine as defined in claim 2, wherein the stator has an axial division dividing the stator into two halves, with the flat section being located entirely in one of said halves.

4. A stator of an electrical machine as defined in claim 1, wherein the stator has a first wall thickness in the first winding holder being less than a second wall thickness in the second winding holder.

5. A stator of an electrical machine as defined in claim 1, wherein the open space receives at least one component in the open space and at a distance away from the stator.

6. A power tool as defined in claim 1, wherein the open space receives at least one component in the open space and at a distance away from the stator.

7. An electrical machine, comprising:
a stator, said stator including a cross section having a separating line dividing the cross section into a first side and a second side which are diametrically opposite to one another;
a housing accommodating the stator and a rotor located inside the stator;
a plurality of winding holders including at least a first winding holder located in the first side and having a first winding width, and a second winding holder located in the second side and having a second winding width being less than the first winding width, the first and second winding holders being provided diametrically opposite to one another and asymmetrically around the separating line on the cross section;
wherein the first winding holder defines an open space in the first side between the housing and the stator, which is opens pace is greater than space defined by the second winding holder in the second shape.

8. An electrical machine as defined in claim 7, further comprising a jacket surface having a flat section whereat the first winding holder is located.

9. An electrical machine as defined in claim 8, wherein said jacket surface is configured to fit inside the housing.

10. An electrical machine as defined in claim 9, wherein the housing is a cylindrical motor housing, said jacket surface being configured to fit inside said cylindrical motor housing.

11. An electrical machine as defined in claim 7, wherein the electrical machine is a universal motor.

12. An electrical machine as defined in claim 7, wherein the open space receives at least one component in the open space and at a distance away from the stator.

13. A power tool, comprising:
a stator of a motor of the power tool, said stator including a cross section having a separating line dividing the cross section into a first side and a second side which are diametrically opposite to one another; a plurality of winding holders comprising at least a first winding holder located in the first side and having a first winding width, and a second winding holder located in the second side and having a second winding width being less than the first winding width, the first and second winding holders being provided diametrically opposite to one another and asymmetrically around the separating line on the cross section;
a housing accommodating the stator and a rotor located inside the stator; wherein the first winding holder defines an open space in the first side between the housing and the stator, which open space is greater than a space defined by the second winding holder in the second side.

14. A power tool as defined in claim 13, wherein said at least one component comprises at least one of a sliding element, at least one electrical line, an electronic component, an electrical component, a signal line, and a fluid line.

15. A power tool as defined in claim 13, wherein the power tool is configured as an angle grinder.

\* \* \* \* \*